Jan. 16, 1968  C. NEEL, JR  3,363,914
LOAD EQUALIZING DEVICE
Filed June 7, 1966  2 Sheets-Sheet 1

Coke Neel, Jr.
INVENTOR.

BY *Clarence A. O'Brien*
*and Harvey B. Jacobson*
Attorneys

Jan. 16, 1968  C. NEEL, JR  3,363,914
LOAD EQUALIZING DEVICE
Filed June 7, 1966  2 Sheets-Sheet 2

Coke Neel, Jr.
INVENTOR.

BY
Attorneys

United States Patent Office 3,363,914
Patented Jan. 16, 1968

3,363,914
LOAD EQUALIZING DEVICE
Coke Neel, Jr., P.O. Box 1923, Longview, Tex. 75601
Filed June 7, 1966, Ser. No. 555,752
14 Claims. (Cl. 280—405)

The instant invention relates to new and useful improvements in load equalizing devices for tractor-trailer vehicles.

While load transferring devices for fifth wheel connected tractor-trailer vehicles have heretofore been known, the known devices generally have limited practical utility. Such known devices are generally not adaptable for use with different height fifth wheels, nor can they be remotely and instantaneously controlled by the operator within the tractor so as to accommodate different road conditions as they occur. Further, the known devices are generally incapable of being completely retracted and disengaged from the trailer, during the operation of the vehicle, so as to not interfere with a sharp angular positioning of the tractor relative to the trailer when, for example, maneuvering within tight spaces. Also, such devices tend to interfere with the free pivotal movement of the trailer relative to the tractor, and are incapable of adjustment on the tractor frame so as to accommodate an adjustable positioning of the fifth wheel. In conjunction with the actual mounting of these load transferring devices, it is considered significant that an actual operation must be performed on the tractor frame itself, either the provision of mounting bolt holes therethrough or the subjecting of the frame to a welding operation, both of which would inherently tend to weaken the frame and are normally prohibited by most manufacturers if any warranty or the like is to remain in effect.

Accordingly, it is the primary object of the instant invention to provide a load equalizing device for a fifth wheel connected tractor-trailer vehicle which avoids all of the above problems through the provision of a load equalizing device which, through a remote controlling thereof from the tractor cab, can be adjusted so as to accommodate different height fifth wheels, so as to provide an instantaneous and exact control over the amount of the load which is being transferred by the device, and so as to effect a complete retracting of the device out of engagement with the trailer when desired. Likewise, the load equalizing device of the instant invention provides for a friction reducing rolling engagement with the trailer in a manner so as to reduce to a minimum any tendency to interfere with the normal lateral swinging of the trailer. And further, the instant device mounts on the tractor frame in a manner which requires no modification or weakening of the frame itself, in addition to also allowing for a complete freedom of adjustment of the device along the frame so as to correspond to any adjusted positioning of the fifth wheel itself.

It is a primary intention of the invention to provide a device which is particularly intended as a means for equalizing the load on all of the axles of a tractor-trailer vehicle so as to enable the transporting of a maximum load while still complying with various state regulations regarding the load limits on individual axles. In other words, by equally distributing the load to all of the vehicle axles, no excess loading condition would appear even where the axles to be individually weighed as is sometime the situation. It should be appreciated that the load equalization applies to the rear trailer axle as well as to the front tractor axle.

Another significant object with regard to the load equalization is an equalization of the load on the brakes, and the attendant simultaneous grabbing of the brakes which results in safer stops, longer brake life, and less tire wear.

It is also considered a signficant object of the instant invention to provide a load equalizing device which, through the provision of better front wheel traction, substantially increases the safety of the vehicle in light of the increased steering control afforded to the driver.

Likewise, it is significant that the device of the instant invention, through an equalization of the load, tends to substantially eliminate a bouncing or waving of the front of the vehicle, thereby eliminating cargo damage and loss, and at the same time providing a smooth ride, longer front tire wear, less wheel bearing wear, less kingpin and bushing wear, and less jolting of the radiator.

In conjunction with the above object, it is also considered significant that the device of the instant invention will act as a shock-absorbing device, particularly desirable on unexpected stretches of corduroy or wavy roads.

In achieving these objects, it is contemplated that the device of the instant invention include a mounting base which bridges the tractor frame and is releasably clamped thereto in a manner which does not affect the structural stability of the tractor frame, and which at the same time enables a free adjustment of the device along substantially the entire length of the frame, or at least along a sufficient portion of the frame so as to accommodate the normal 36 inches along which the fifth wheel itself can be adjusted. In addition, the load equalizing device incorporates a trailer engaging head provided with support rollers so as to avoid any binding between the device and the trailer with the actual thrust of the device into engagement with the trailer being variably achieved through a double acting hydraulic unit and an enlarged expanded coil compression spring which engages between the hydraulic unit and the trailer engaging head.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
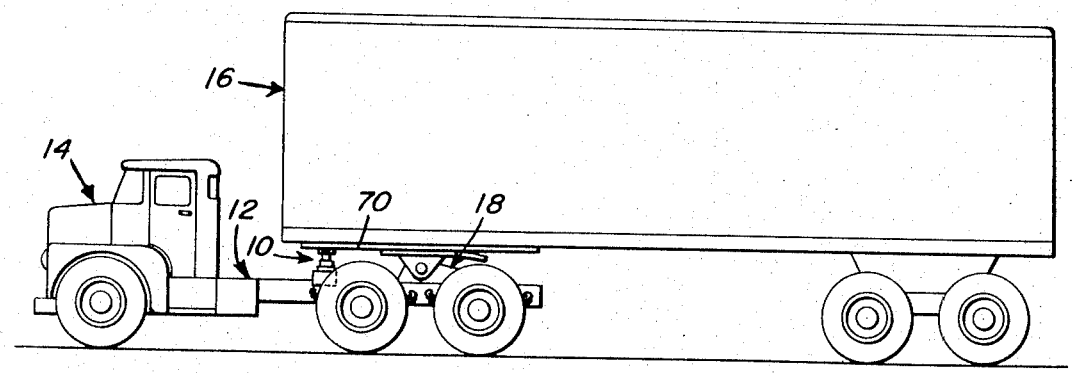
FIGURE 1 is a side elevational view of a tractor-trailer vehicle with the device of the instant invention mounted thereon.
Figure 2:
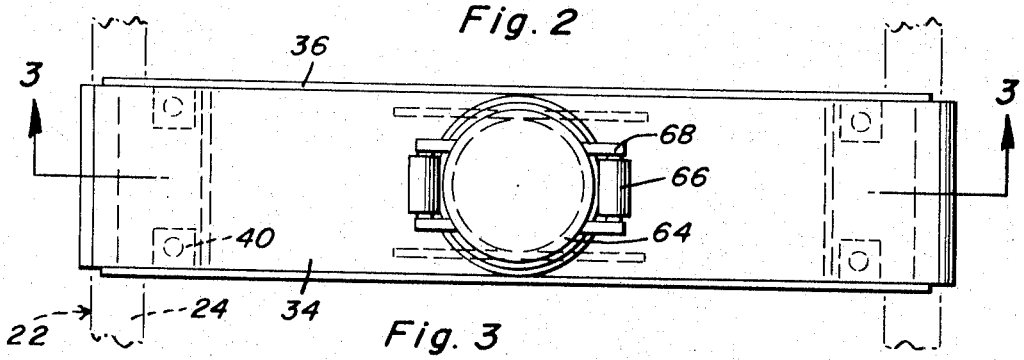
FIGURE 2 is an enlarged top plan view of the device of the instant invention.

Referring now more specifically to the drawings, reference numeral 10 is used to generally designate the load equalizing device comprising the instant invention. This device 10 is to be positioned between the rearwardly extending frame 12 of a tractor 14 and the portion of a trailer 16 mounted by means of a conventional fifth wheel assembly 18 on the tractor 14.

The load equalizing device 10 includes a mounting bridge or frame 20 which bridges or extends across the side rails 22 of the tractor frame 12, these side rails 22 normally being inwardly directed channel members having, in each instance, a horizontally orientated top flange 24. The mounting bridge 20 consists of an elongated flat base plate 26 which overlies the opposed side rail flanges 24, the opposed ends of the plate 26 terminating in downwardly directed end flanges 28 which overlie the outer faces of the vertical portions or webs 30 of the side rails 22. In this manner, the device 10 is centered and properly orientated between the side rails 22 on the tractor frame 12.

The base plate 26 includes an enlarged aperture centrally therethrough which receives the lower end of and rigidly mounts a vertically projecting sleeve 32. The sleeve 32 is further stabilized by means of oppositely inclined brace or bracing plates 34 overlying the opposite sides of the base plate 26 and extending from welded engagement with the sleeve 32 toward the upper end thereof to welded engagement with the opposite extremities of the horizontal length of the base plate 26. Finally, two angular side plates 36 can be provided in welded engagement with the base plate 26 and brace plates 34, thereby providing a truss type bridge 20 capable of effectively transferring a supported load to the outer frame engaging extremities thereof.

Figure 3:
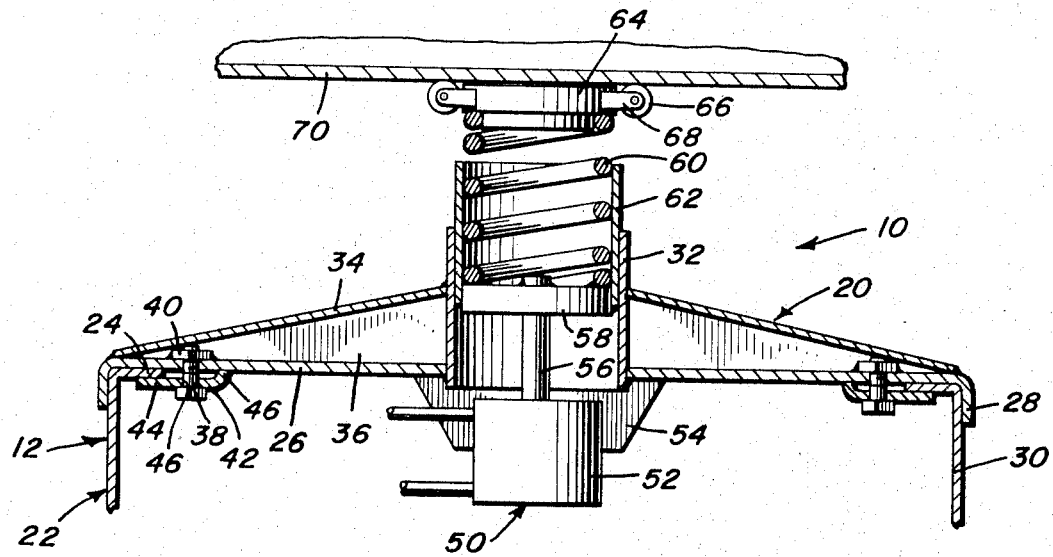
FIGURE 3 is a cross-sectional view taken substantially on a plane passing along line 3—3 of FIGURE 2.
Figure 4:
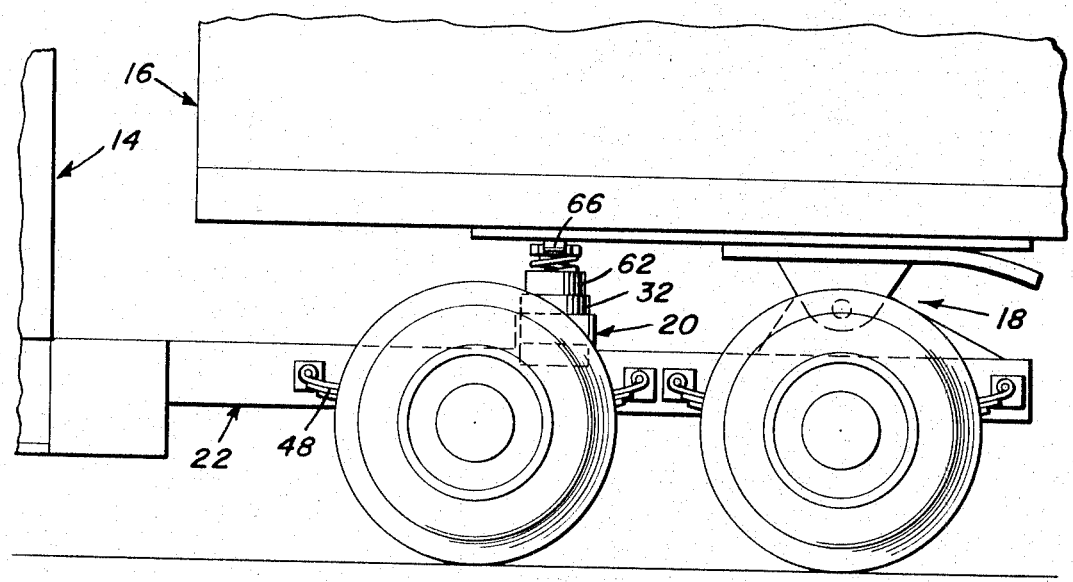
FIGURE 4 is an enlarged partial side elevational view of a tractor-trailer vehicle with the fifth wheel shifted rearwardly so as to accommodate a forwardly projecting extended load trailer.
Figure 5:
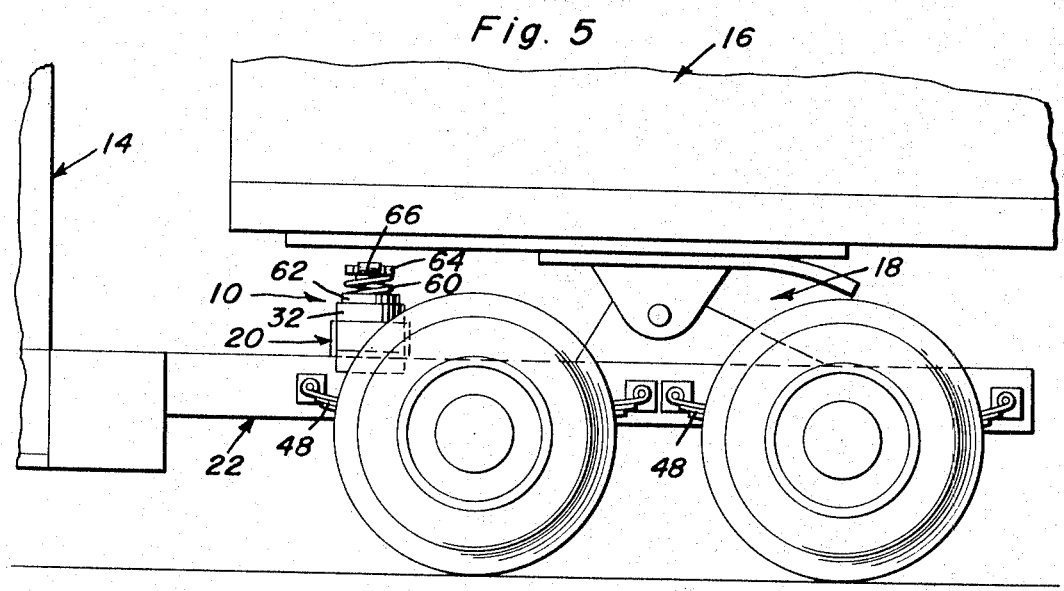
FIGURE 5 is an enlarged partial elevational view illustrating the device of the instant invention retracted out of engagement with the trailer.
Figure 6:
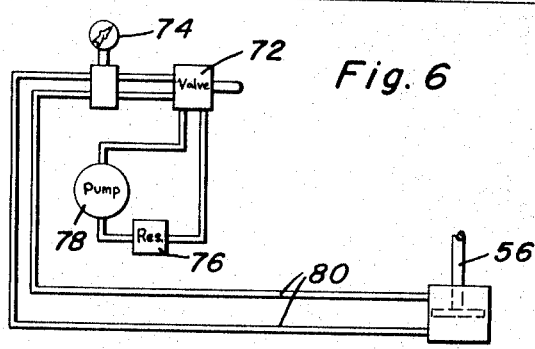
FIGURE 6 is a schematic illustration of the hydraulic unit and the cab mounted control therefor.

Located inwardly of each flanged end of the base plate 26 are a pair of laterally spaced mounting holes 38, these holes 38 being so orientated as to occur in inwardly spaced relation to the inner edge of the corresponding horizontal frame flange 24. Each of these bolt holes 38 has bolt engaging internally threaded means associated therewith which will normally be in the form of a nut 40 welded to the upper surface of the base plate 26 in alignment with the corresponding hole 38 whereby an upwardly directed mounting bolt 42 can be threadedly engaged thereinto. Associated with each pair of holes 38, and associated bolts 42, at each end of the base plate 26 is a transversely elongated clamping plate 44 which includes an upwardly directed flange 46 located inwardly of the corresponding aligned bolt holes 38. As will be appreciated from FIGURE 3, each clamping plate 44 is to be positioned in underlying relation to the base plate 26 with the flange 46 engaging the undersurface of the plate 26 and with the outer edge portion of the clamping plate 44 underlying the tractor frame flange 24 in a manner whereby, upon an extension of the two associated bolts 42 through a pair of holes 46 in the clamping plate 44 aligned with the holes 38, an upward drawing or pivoting of the outer portion of the clamping plate 44 so as to engage the adjoining frame rail flange 24 between the clamping plate 44 and the overlying base plate portion is effected in a manner which rigidly locks the device 10 of the tractor frame 12 without requiring any reduction in the strength of the rails 22 such as would occur were bolt holes to be extended therethrough or were any portion of the device 10 to be welded thereto. Further, the utilization of the frame clamping structure described supra enables the device 10 to be adjusted along substantially the full length of the tractor frame 12 without interference from the tractor springs 48 or the like in that the fixed although releasable engagement with the frame rails 22 is effected at the flanged upper edges thereof. This particular feature is deemed significant in that the device 10 is thereby free to be adjusted and exactly positioned so as to correspond to any adjusted position of the fifth wheel unit 18, facilities normally being provided for enabling an adjustment of such units 18 within a distance of approximately 36 inches.

With regard to the actual load transferring portion of the device 10, it will be noted that a reversible hydraulic unit 50 is mounted in coaxial alignment with the sleeve 32. The unit 50 includes a sealed cylinder 52 positioned below the sleeve 32 and rigidly mounted by a pair of depending side plates 54 welded to both the overlying base plate 26 and the wall of the cylinder 52. An elongated piston rod 56 projects vertically from the cylinder 52 coaxially into the sleeve 32 and mounts, on the upper end thereof, an enlarged support head 58. The piston head 58 in turn has the lower end of an expanded coiled compression spring 60 fixedly welded thereto, this spring 60 having a substantial portion of the height thereof freely received within an elongated encircling tubular collar 62 welded to the periphery of the head 58 and slidably received within the sleeve 32. The upper end of the spring 60 is in turn rigidly engaged with a flat enlarged bearing head 64 which in turn supports, at diametrically opposed portions thereof longitudinally aligned over the support bridge 20, a pair of support rollers 66, each rotatably mounted between a pair of outwardly projecting ears 68 in a manner whereby the upper portion of the periphery will be located in a plane spaced above the top of the bearing head 64 so as to receive and rollingly support the superimposed load of the trailer 16. These support rollers 66 will normally engage directly against the fifth wheel upper plate 70.

The hydraulic unit 50 is to be controlled directly from the cab of the tractor 14 through a suitable control element 72, an appropriate easily read gage 74 also being provided within the cab so as to afford a visual indication of the pressure within the cylinder 52 and the orientation of the supporting elements of the device 10. A fluid reservoir 76 and pump 78 are also to be conveniently located on the tractor 14 with appropriate quick lock coupling means being provided for a connection of the fluid lines 80.

In operation, after the trailer 16 is, through the fifth wheel unit 18, engaged with the tractor 14, the load equalizing device 10 is longitudinally moved along the tractor frame 12 to engage beneath the trailer forward of the fifth wheel, and subsequently fixedly clamped into position by means of the two elongated clamping plates 44 and the two bolts associated with each plate. Next, the hydraulic unit 50 is extended and the bearing head 64, and more particularly the support rollers 66 thereon, brought into engagement with the undersurface of the fifth wheel upper plate 70 in a manner so as to receive a portion of the superimposed load and transfer this load to the tractor frame 12 forward of the fifth wheel unit 18. The tubular rigid collar 62 surrounding the spring 60 is of significance in providing a substantial degree of lateral stability to the spring 60 without affecting, and while in effect insuring, the proper functioning of the spring 60 as a shock-absorbing medium. While not specifically limited thereto, it is contemplated that the hydraulic unit 50 and compression spring 60 both have approximately a 10-ton load capability. In addition, the hydraulic unit 50 has been specifically defined as being double-acting, the significance of this residing in the ability of the device 10 to be completely retracted out of engagement with the trailer 16 so as to enable a sharp angle positioning, on the order of 90°, of the tractor 14 to the trailer 16, thus facilitating a maneuvering of the vehicle in confined spaces, the withdrawal of the device 10 being rapidly controlled directly from the cab by the driver of the vehicle. Other significant features reside in the provision of a rolling support for the trailer so as to enable an effective transfer of a portion of the load without inhibiting the desired movement of the trailer relative to the tractor to any substantial degree, and the provision of a unique mount for the device which enables the device to be mounted at any desired point along a conventional truck frame without modifying or weakening the frame in any manner, and without regard to the location of the springs or the like associated with the tractor axles. This ability to shift the load equalizing device is particularly significant in that, in order to accommodate various loading situations such as trailers having extended loads on the front thereof, it is frequently required to shift the fifth wheel assembly, with a rearward shifting of the fifth wheel assembly under the conventional vehicle arrangement giving rise to a potential highly dangerous situation in view of the removal of almost the entire load from the front or steering wheels. Such a situation is easily overcome with the device of the instant invention which is capable of quickly being shifted rearwardly with the fifth wheel assembly and activated so as to stabilize the load on the axles, including both the front tractor axle and the rear trailer axle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A load equalizing device utilized between the tractor and trailer of a combined vehicle comprising an elongated mounting base positionable transversely across a tractor frame, trailer engaging means mounted centrally on said base, positioning and load transferring means operatively connected between the base and trailer engaging means for varying the vertical position thereof and the load received thereby, and mounting means on each end portion of said base for releasable engagement with a tractor frame, said mounting means comprising a clamping plate underlying and generally paralleling said base, and means engaged between said plate and said base for drawing said plate toward said base for clamping a portion of a tractor frame therebetween, the means for drawing each plate toward the overlying portion of the base being located inward of that edge of the plate directed outward toward the corresponding outer end of the base so as to allow for a positioning of a portion of a tractor frame between the plate and base laterally of the means for drawing the plate toward the base.

2. The device of claim 1 wherein the second edge of each plate is upwardly directed into abutting engagement with overlying base so as to allow for a pivotal movement of the guide plate toward the base about said second edge.

3. The device of claim 2 wherein said positioning means includes a vertically orientated double-acting hydraulic unit comprising a cylinder and a piston rod projecting upwardly therefrom, a support head on the upper end of the piston rod, and a compression spring fixed to said head and projecting thereabove, said trailer engaging means being fixed to the upper end of said spring.

4. The device of claim 3 including a spring stabilizing collar fixed to said head and projecting upwardly therefrom in surrounding relation to said spring along a substantial portion of the height thereof.

5. The device of claim 4 including a guide sleeve fixed to said base and projecting upwardly therefrom in surrounding relation to said rod, head and spring encircling collar.

6. The device of claim 5 wherein said base includes downwardly directed flanges on the opposite ends thereof in outwardly spaced relation to the adjoining clamping plate for engagement with the opposed sides of a tractor frame.

7. The device of claim 6 including brace means engaged between the outer end portions of the base and the sleeve toward the upper end thereof.

8. The device of claim 7 wherein said trailer engaging means comprises an enlarged head and a pair of rollers mounted thereon in outwardly spaced relation thereto, said rollers projecting slightly above the associated head.

9. The device of claim 1 wherein said base includes downwardly directed flanges on the opposite ends thereof in outwardly spaced relation to the adjoining clamping plate for engagement with the opposed sides of a tractor frame.

10. A load equalizing device utilized between the tractor and trailer of a combined vehicle comprising an elongated mounting base positionable transversely across a tractor frame, trailer engaging means mounted centrally on said base, positioning and load transferring means operatively connected between the base and trailer engaging means for varying the vertical position thereof and the load received thereby, and mounting means on said base for engagement with a tractor frame, said positioning means including a vertically orientated double-acting hydraulic unit comprising a cylinder on a piston rod projecting upwardly therefrom, a support head on the upper end of the piston rod, and a compression spring fixed to said head and projecting thereabove said trailer engaging means being fixed to the upper end of said spring.

11. The device of claim 10 including a spring stabilizing collar fixed to said head and projecting upwardly therefrom in surrounding relation to said spring along a substantial portion of the height thereof.

12. In a tractor-trailer vehicle having a fifth wheel connection therebetween, a tractor frame, said frame including a pair of elongated laterally spaced side rails, each rail including a vertical member and an inwardly projecting upper flange, a load equalizing device, said device including an elongated base positioned transversely across said side rails, a clamping plate underlying each side rail flange, each plate including a portion thereof projecting inwardly beyond said flange, means engaged between the inwardly projecting portion of each clamping plate and the base thereabove for drawing said plate toward said base and releasably clamping any portion of the rail flange therebetween along a predetermined portion of the rail, a vertically extensible and retractable fluid ram unit mounted centrally on said base, a compression spring mounted on said unit and projecting thereabove for vertical adjustment by said unit, and a trailer engaging bearing head on the upper end of said spring.

13. The structure of claim 12 wherein said base includes downwardly directed flanges on the outer ends of said base engaged against the vertical members of the side rails.

14. The structure of claim 13 including a vertical sleeve fixed to said base and projecting vertically therefrom in surrounding relation to said ram unit and spring, and a collar fixed to the extensible portion of the ram unit and encircling the spring upwardly from the lower end thereof for a portion of its vertical height, said collar being slidably received with said sleeve.

References Cited
UNITED STATES PATENTS

| | | | |
|---|---|---|---|
| 2,250,134 | 7/1941 | Pointer | 280—439 |
| 2,317,508 | 4/1943 | Zoder | 280—407 |
| 2,727,755 | 12/1955 | Hume | 280—405 |
| 2,941,818 | 6/1960 | Hubbard | 280—405 |
| 3,136,566 | 6/1964 | Harding | 280—405 |
| 3,227,470 | 1/1966 | Funk | 280—405 |

LEO FRIAGLIA, *Primary Examiner.*